United States Patent [19]

Riekert et al.

[11] Patent Number: 4,867,953
[45] Date of Patent: Sep. 19, 1989

[54] METHOD FOR THE SELECTIVE ELIMINATION OF NITROGEN OXIDES FROM EXHAUST GASES

[75] Inventors: Lothar Riekert, Karlsruhe; Michael Kotter, Bruchsal; Friedrich Weyland, Leimen, all of Fed. Rep. of Germany

[73] Assignee: Kraftanlagen AG, Fed. Rep. of Germany

[21] Appl. No.: 6,551
[22] PCT Filed: Feb. 19, 1986
[86] PCT No.: PCT/EP86/00072
  § 371 Date: Dec. 11, 1986
  § 102(e) Date: Dec. 11, 1986
[87] PCT Pub. No.: WO87/04947
  PCT Pub. Date: Aug. 27, 1987
[51] Int. Cl.$^4$ .............................................. B01D 53/36
[52] U.S. Cl. .................................................. 423/239
[58] Field of Search ............ 423/239 A, 239, DIG. 13

[56] References Cited

U.S. PATENT DOCUMENTS

| | | | |
|---|---|---|---|
| 4,288,420 | 9/1981 | Ito et al. | 423/244 A |
| 4,324,770 | 4/1982 | Bakke | 423/244 A |
| 4,602,673 | 7/1986 | Michelfelder et al. | 423/239 |

FOREIGN PATENT DOCUMENTS

| | | | |
|---|---|---|---|
| WO8601431 | 3/1986 | Int'l Pat. Institute | 423/239 A |
| 50-11970 | 2/1975 | Japan | 423/239 |
| 51-285578 | 3/1976 | Japan | 423/239 A |
| 54-25264 | 2/1979 | Japan | 423/239 |
| 54-37065 | 3/1979 | Japan | 423/239 |
| 54-118382 | 9/1979 | Japan | 423/239 A |
| 22331 | 2/1980 | Japan | 423/239 A |
| 220129 | 10/1985 | Japan | 423/239 A |

*Primary Examiner*—John Doll
*Assistant Examiner*—Jeffrey Edwin Russel

[57] ABSTRACT

Method for the selective elimination of nitrogen oxides from flue gases, especially from the flue gases from furnaces.

For the denitration, the flue gases are brought together with catalytically active solid bodies through which the flue gases can flow on account of their structural makeup and/or because they are in the form of a loose bed. A reducing agent, mixed if desired with a carrier gas, is brought in contact with the catalytically active solid or sections thereof, in alternation with the flue gases containing the nitrogen oxides that are to be reduced.

20 Claims, 1 Drawing Sheet

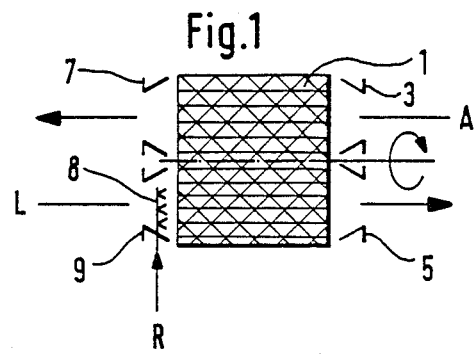
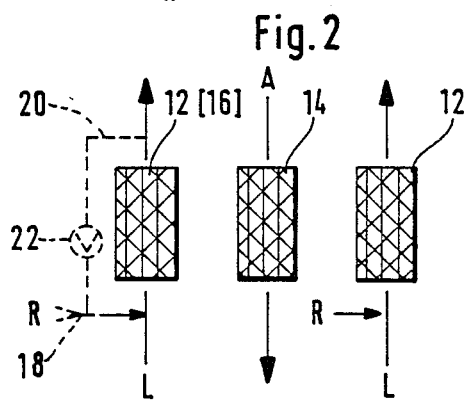
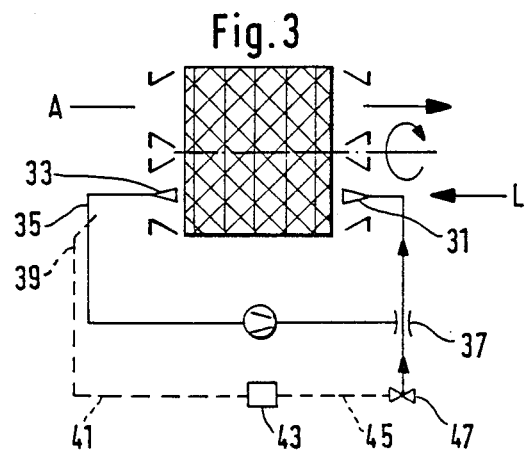

METHOD FOR THE SELECTIVE ELIMINATION OF NITROGEN OXIDES FROM EXHAUST GASES

The invention relates to a method for the selective elimination of nitrogen oxides from exhaust gases with a reducing agent, by making use of catalytically active solid bodies through which the exhaust gases can flow on account of their structural makeup and/or because they are employed in the form of a loose bed.

For the selective reduction of nitrogen oxides in the flue gases of furnaces it is known to introduce into the exhaust gases issuing from the furnace ammonia as a reducing agent, either under pressure, in the form of a vapor mixed with air as a carrier, or without pressure, in the form of a solution in water. Through mixing sections involving appropriate packing within the continuing flue gas ducts the attempt is made to obtain a streakless ammonia and temperature distribution in the flue gas stream until it enters the catalyst. While providing for optimum reaction temperatures within the flue gas stream, the catalyst is placed ahead of the circulating regenerative heat exchanger which transfers the flue gas heat to the combustion air being fed to the furnace. The best catalysts have proven to be solid-bed catalysts through which the flue gas flows vertically downward, while the gas that is to be denitrated flows through several of them alternately. The honeycomb structure of these solid-bed catalysts contains vanadium compounds as the catalytically active substances. These vanadium compounds promote the reaction of the nitrogen oxides with the ammonia previously introduced into the flue gas stream and thoroughly mixed therewith on its way to the catalyst. The reaction with the nitrogen oxides contained in the flue gases leads substantially to molecular nitrogen and water as reaction products, which can be discharged harmlessly into the environment. The considerable pressure loss occurring as the flue gases pass through the catalyst must be taken into consideration in determining the size of the flue gas blower. The vertically downward flow within the catalyst is intended to counteract the deposit of solid impurities in the catalyst interior or keep them within limits. After a period of time of operation, the coatings that are produced are removed from time to time by blasting with compressed air or steam, and discharged from the catalyst bed. The effective life of the catalytically active substances in the catalyst bed amounts to more than 2 years, depending on the boiler design, manner of operation and fuel composition. The nitrogen still remaining in denitrated flue gases issuing from the catalyst must be removed before they enter the flue gas washer for the removal of sulfur oxides, so as to prevent reactions that otherwise would take place resulting in products which would negatively affect the purification and lead to problems in the purification of the resultant waste water.

The invention is addressed to the problem of devising a method for the selective elimination of nitrogen oxides from flue gases by the use of catalytically active solid bodies, in which the reduction of the nitrogen oxides is substantially improved by achieving better utilization of the reducing agent and the catalytically active substances within the catalysts, sustaining the catalytic properties over longer periods of operation, and preventing undesired secondary reactions.

In consideration of the knowledge that the conversion of nitrogen oxides, which are composed of about 95% nitrogen monoxide and about 5% nitrogen dioxide, to molecular nitrogen and water depends not only on the ratio of the amount of the introduced reducing agent to the nitrogen oxide content in the flue gases and on the temperature level of the flue gases, but also to a great extent on the effectiveness of the catalyst, this problem is solved according to the invention, setting out from a process of the kind described above, by bringing the reducing agent, mixed with a carrier gas if desired, and the flue gases containing the nitrogen oxides, into contact periodically and alternately with the catalytically active solid body or with sections of same. By this procedure the reducing agent is introduced into the catalytically active solid body before the flue gases pass through it. The reducing agent is stored in the catalytically active solid body or is modified in the latter such that it is ready to react with the nitrogen oxides contained in the flue gases subsequently introduced into it and reacts selectively therewith. In the use of ammonia as reducing agent it was found that the formation of ammonium bisulfate, which was formerly observed when ammonia was fed into the flue gases of furnaces and mixed with the latter before introduction into catalysts, and which was an undesirable reaction prior to the removal of nitrogen, is almost completely prevented. What is of foremost importance in this case is not the saving of reducing agents but mainly the exclusion of undesirable deposits which occupy the catalysts and/or parts of the equipment following them and which mechanically poison the active surface of the catalysts for the denitration of boiler installations.

To the advantage of continuous operation, the reducing agent and the nitrogen-containing flue gases can pass simultaneously through the catalytically active solid body, and it can also be desirable to subject the catalytically active solid body also to a constant self-cleaning with clean gases; the heat-transferring properties of the solid body can then also be utilized if sections of the ductwork delivering the reducing agent or the reducing agent and gaseous carrier, those delivering the flue gases to be freed of nitrogen oxides and, where used, those delivering the cleaning gases, are subjected to a step-wise or continuous rotatory movement relative to the catalytically active solid body. For example, flue gases can be denitrated and cooled, while at the same time fresh air carried through the solid as cleaning gas is used for the cleaning of the catalyst bed and is then utilized finally as preheated combustion air for the furnace.

Feeding the reactant alternately or successively through two or more static, catalytically active solid bodies arrayed in parallel, and doing so before feeding them with the flue gases to be denitrated, offers the advantage that, while sustaining boiler output, it is possible to take out of operation and clean or regenerate catalytically active solid bodies when their performance becomes considerably degraded because they are dirty or because they are poisoned.

By the introduction of the reducing agent into the cleaning gas passage, the surfaces of the catalytically active solid body can be enriched with the reducing agent or the latter can be stored in the strata close to the surface before contact with the nitrogen oxides in the flue gases takes place, so that undesirable secondary reactions are advantageously suppressed.

By the use of a nozzle tube for the introduction of the reducing agent, the reducing agent is advantageously divided into partial streams and delivered controlledly, via the cleaning gases as carriers, to the catalytically active solid body. In the case of rotating, catalytically active solid bodies it is recommended for this purpose to associate the injection locally with the transition of the sectors from the cleaning gas duct to the flue gas duct.

An especially advantageous method for dealing with the reducing agent consumption and the controlled feeding of same into the catalytically active solid body is obtained by the use of probes associated with opposite ends of the solid body or by forming an additional passage between the flue gas and cleaning gas passages in order to be able to return the reducing agent through a bypass outside of the catalytically active body. In this case the reducing agent can be circulated and reducing agents can be additionally fed into the circuit continuously or discontinuously.

It can furthermore be advantageous if the feeding of the additional reducing agent into the circuit is controlled independently of reducing agent consumption levels measured at the exit end of the catalytically active solid body.

There are various possibilities for pumping the reducing agent within the circuit. In addition to the use of pumping means, such as a blower for example, there is also the use of a reducing agent continuously fed into the circuit as a means of propelling the reducing agent stream that is to be returned.

If the reducing agent is circulated in the above-mentioned manner by a blower or other pumping means, it can be desirable to throttle the circulated reducing agent at the exit end of the solid body or in the adjoining section of the reducing agent circuit which is situated ahead of the infeed of additional reducing agent and ahead of the pumping means, for the purpose of thus increasing the pressure in the circuit within the catalytically active solid body. It has been found that in this manner a stronger binding of reducing agent to the catalytically active surfaces of the solid body is achieved and thus an enhancement of the catalyst action.

According to the solutions set forth above, the reducing agent is presented to the catalytically active solid body at higher concentrations and within it a larger amount of reducing agent, such as ammonia, is offered controlledly for reaction with the nitrogen oxides in the flue gases so that an intensified reaction of nitrogen oxides is achieved. Precisely in this connection, it is important that in this case any loss of unused reducing agent from the catalytically active solid body, with the ensuing consequences for system components that follow, such as the components of an flue gas desulfuration system, can be effectively countered.

The solutions set forth are important not only for the denitration of flue gases of furnaces — boilers for example — but also they can be used in the same manner to advantage for the denitration of exhaust gases of internal combustion engines — at static engine test stands, for example.

The invention is further explained below in conjunction with the drawing in which each figure represents diagrammatically:

FIG. 1 the feeding of the reactant into a catalytically active solid body in which the flue gases to be denitrated, plus clean air, are flowing, and which moves relative to the connecting passages, FIG. 2 the feeding of the reducing agent alternately into static, catalytically acting solids, FIG. 3 the feeding of the reducing agent into a catalytically active solid body moving, as in FIG. 1, relative to its connecting passages, but in this case the reducing agent is circulated through the solid.

In the example represented in FIG. 1 it is assumed that the reducing agent, mixed in some cases with a carrier gas, is brought continuously by the air current L into contact with a catalytically active solid body 1 within a sector-shaped section. For this purpose the catalytically active solid body moves continuously or discontinuously within a casing (not shown), relatively to the passages connecting it to the air and flue gases. In the illustrated case, this movement is produced by a rotation of the solid body about its longitudinal central axis. In the embodiment represented it is assumed that the carrier of the catalytically active solid body 1 rotates while the connecting passages or gas connections 3 and 5, and 7 and 9, are at rest facing its opposite ends. The air serving as the clean gas or carrier gas passes through the connecting passage 9 in the form of a connector (on the left side in the drawing) into the catalytically active solid body 1, and leaves it through the connecting passage 5, also in the form of a connector, on the right side of the drawing. Into this air stream is fed, through a nozzle tube 8 in front of the entrance into the solid, a reducing agent R which is carried by the air stream as carrier gas into the catalytically active solid body, brought in contact with its surface, and stored therein. With the rotation of the catalytically active solid body, the sector-shaped section, enriched with the reducing agent in this manner, then enters into the flue gas sector of the solid, which is disposed in the drawing above the air-fed sector. Into this flue gas sector the flue gases enter through the connecting passage 3 in the form of a connector, and they leave the solid on the left side through the connecting passage 7. Continued rotation then brings the sector fed by the flue gases back into the sector through which air flows. The air stream then flowing again through the sector has the purpose, in addition to its above-mentioned role as a carrier gas for finely distributing the reducing agent over the sector-shaped section of the solid, of performing a cleaning function, in that dust particles deposited to a special extent at the flue-gas entry end are removed by the air stream and carried out of the catalytically active solid body. Finally this air stream, after undergoing a cleaning, for example in centrifugal air separators, can be used as combustion air for the furnace producing the flue gases.

In the embodiment according to FIG. 2, flue gas and air are fed alternately and periodically through three static, catalytically active solid bodies 12—14—12. By appropriate manipulation of the gas streams, each catalytically active solid body is successively fed, first — as indicated in the case of solid body 12 —upwardly with an air stream L, and then — as indicated in the case of the catalytically active solid body 14 —with flue gases flowing downwardly. For the reduction of the undesired flue gas components — as indicated in broken lines on the outside left of FIG. 2 — at about the end of the flow of air the reducing agent is introduced into it through a line 18 and distributed over the entry cross section by the air stream into the catalytically active solid body and brought into contact with its catalytically active surfaces. On the other hand, it is also possible to proceed such that, in addition to the catalytically active solid bodies 12 and 14, an additional static solid body 16 is provided, and then the period of feeding air and reducing agent through the solid body can be separated in the sense that the reducing agent — mixed if desired with a carrier gas — is injected in a separate reduction cycle at the end of the air feed, but before the subsequent input of the flue gases. The reducing agent is then returned from the exit end through the duct 20 represented in broken lines in the drawing, by a pumping means in the form, for example, of a blower 22, and fed back into the solid body 16.

FIG. 3 represents a procedure that has been developed beyond the procedure represented in FIG. 1, in which a circulation of the reducing agent — mixed if desired with a carrier gas — is performed in an additional sector separate from the air and flue gas sectors L and A. This sector is formed by the probes or passage connections 31 and 33 associated with the opposite ends. The exit end of the passage connection 33 is joined by a return duct 35 by which reducing agent not retained in the solid body is captured and returned by the pumping means 37 to the input end. The content of reducing agent in the carrier gas is determined by a meter probe 39 and delivered as a control magnitude to a controller 43 through a signal line 41. Regardless of the determined actual content, an additional feed of reducing agent is performed through a control line 45 leading from the controller 43 to a control valve 47 within the reducing agent line, such that the reducing agent contained in the carrier gas will again be at the required concentration. This procedure includes the delivery of the reducing agent back to the entrance end by reducing agent fed freshly into the circuit and simultaneously serving as propellant.

We claim:

1. A method of selectively removing nitrogen oxide from exhaust gases in an apparatus comprising at least one catalytically active solid body with a plurality of sections, a first conduit for a reducing agent and a second conduit for exhaust gas, comprising the steps of: introducing reducing agent from the first conduit into a first section so that the reducing agent is stored therein, passing exhaust gas from the second conduit through a second section, moving the solid body relative to the first and second conduits such that said first section with the stored reducing agent therein is in communication with said second conduit for exhaust gas, passing exhaust gas from said second conduit through said first section with the stored reducing agent therein so that nitrogen oxide contained in the exhaust gases is reduced by the stored reducing agent, repeating said steps in a step-wise manner, such that a respective section with the reducing agent stored therein is immediately subsequently passed through by exhaust gas, and passing clean gas through the section previously passed through by the exhaust gases.

2. A method of selectively removing nitrogen oxide from exhaust gases in an apparatus comprising at least one catalytically active solid body with a plurality of sections, a first conduit for a reducing agent and a second conduit for exhaust gas, comprising the steps of: introducing reducing agent from the first conduit into a first section so that the reducing agent is stored therein, passing exhaust gas from the second conduit through a second section, moving the solid body relative to the first and second conduits such that said first section with the stored reducing agent therein is in communication with said second conduit for exhaust gas, passing exhaust gas from said second conduit through said first section with the stored reducing agent therein so that nitrogen oxide contained in the exhaust gases is reduced by the stored reducing agent, repeating said steps in a continuous manner, such that a respective section with the reducing agent stored therein is immediately subsequently passed through by exhaust gas, and passing clean gas through the section previously passed through by the exhaust gases.

3. A method according to claim 1, wherein the reducing agent is introduced intermixed with a carrier gas.

4. A method according to claim 2, wherein the reducing agent is introduced intermixed with a carrier gas.

5. A method according to claim 1, wherein the section through which the clean gases pass is that into which subsequently the reducing agent is introduced.

6. A method according to claim 2, wherein the section through which the clean gases pass is that into which subsequently the reducing agent is introduced.

7. A method according to claim 1, wherein the apparatus comprises a nozzle, and wherein the reducing agent is subdivided into partial streams by said nozzle.

8. A method according to claim 2, wherein the apparatus comprises a nozzle, and wherein the reducing agent is subdivided into partial streams by said nozzle.

9. A method according to claim 1, wherein reducing agent in excess of that stored in said first section is removed from said solid body.

10. A method according to claim 2, wherein reducing agent in excess of that stored in said first section is removed from said solid body.

11. A method according to claim 1, wherein the reducing agent is introduced in at least one further section between the second section and the section into which clean gas is introduced.

12. A method according to claim 1, wherein the reducing agent is introduced in at least one further section between the second section and the section into which clean gas is introduced.

13. A method according to claim 9, 10, 11 or 12, wherein reducing agent in excess of that stored in the respective section is returned in a bypass, and reintroducing the excess reducing agent from the bypass into the solid body while adding additional reducing agent thereto.

14. A method according to claim 13, wherein the amount of additional reducing agent is selected to be dependent on the measured concentration thereof upon passage of the reducing agent through the solid body.

15. A method according to claim 13, wherein the excess reducing agent has its pressure increased while in the bypass.

16. A method according to claim 14, wherein the excess reducing agent has its pressure increased while in the bypass.

17. A method according to claim 16, wherein the reducing agent is throttled after passage through the solid body and prior to feeding of additional reducing agent and prior to increase in pressure.

18. A method according to claim 15, wherein the reducing agent is returned by the additional reducing agent serving as a propellent.

19. A method according to claim 16, wherein the reducing agent is returned by the additional reducing agent serving as a propellent.

20. A method according to claim 11 or 12, wherein the clean gas serves as carrier gas for the reducing agent.

* * * * *